United States Patent
Jung

(10) Patent No.: US 10,753,513 B2
(45) Date of Patent: Aug. 25, 2020

(54) TUBE LOCKING AND RELEASING DEVICE FOR FIRE SUPPRESSION SYSTEM

(71) Applicant: SEUNGJIN IND. CO., LTD., Gyeonggi-do (KR)

(72) Inventor: Woon Taek Jung, Gyeonggi-do (KR)

(73) Assignee: SEUNGJIN IND. CO., LTD. (KR)

( * ) Notice: Subject to any disclaimer, the term of this patent is extended or adjusted under 35 U.S.C. 154(b) by 0 days.

(21) Appl. No.: 16/284,816

(22) Filed: Feb. 25, 2019

(65) Prior Publication Data

US 2019/0271413 A1 Sep. 5, 2019

(30) Foreign Application Priority Data

Mar. 2, 2018 (KR) .................. 10-2018-0025252
Jul. 13, 2018 (KR) .................. 10-2018-0081583

(51) Int. Cl.
*A62C 37/50* (2006.01)
*F16L 3/10* (2006.01)
*A62C 35/68* (2006.01)

(52) U.S. Cl.
CPC ............ *F16L 3/1075* (2013.01); *A62C 35/68* (2013.01)

(58) Field of Classification Search
CPC ........ A62C 35/68; F16L 31/1075; F16L 3/02; F16M 13/027
See application file for complete search history.

(56) References Cited

U.S. PATENT DOCUMENTS

| | | | | |
|---|---|---|---|---|
| 8,500,079 B2* | 8/2013 | Oh | .......................... | E04B 9/006 248/343 |
| 9,308,408 B2* | 4/2016 | Nappa | ....................... | C08J 9/144 |
| 10,173,088 B2* | 1/2019 | Chong | ..................... | B05B 15/62 |
| 10,203,050 B2* | 2/2019 | Jung | ........................ | E04B 9/006 |
| 2013/0048822 A1* | 2/2013 | Liu | .......................... | A62C 35/68 248/316.5 |
| 2013/0284862 A1* | 10/2013 | Lim | ......................... | F16L 3/02 248/62 |
| 2015/0060613 A1* | 3/2015 | Lim | ........................ | F16B 2/185 248/75 |

* cited by examiner

*Primary Examiner* — Amy J. Sterling
(74) *Attorney, Agent, or Firm* — Mendelsohn Dunleavy, P.C.

(57) ABSTRACT

The present invention provides a tube locking and releasing device, the device including: a tube seating structure including: a seating bottom of a rectangular shape; and opposing seating walls standing to face each other on opposite edges of the seating bottom; a tube covering structure including: opposing cover walls being hinged to each of the seating walls so as to intermittently cover the seating wall; and a cover ceiling connecting each of the cover walls to each other; a tube fixing structure including: a handle fixing part being hinged to a second side part of the cover wall and being intermittently locked to each of the seating walls; and a handle press part protruding from the handle fixing part; and a tube pressing structure being attached to/detached from the cover ceiling and protruding downward from the cover ceiling when attached to the cover ceiling.

27 Claims, 16 Drawing Sheets

TUBE LOCKING AND RELEASING DEVICE FOR FIRE SUPPRESSION SYSTEM

CROSS REFERENCE TO RELATED APPLICATION

The present application claims priority to Korean Patent Application Nos. 10-2018-0025252 and 10-2018-0081583, filed Mar. 2, 2018 and Jul. 13, 2018, respectively, the entire contents of which is incorporated herein for all purposes by this reference.

BACKGROUND OF THE INVENTION

Field of the Invention

The present invention relates to a tube locking and releasing device for a fire suppression system, wherein a sprinkler for discharging fire suppression water supplied through a fire suppression pipe during a fire occurrence in a building is fixed at a predetermined position.

Description of the Related Art

In recent years, the fire services act of Korea has applied seismic design criteria of fire suppression facilities to buildings so as to protect the lives and properties of residents and workers from a fire by preventing, warning of, and suppressing a fire due to natural disasters, earthquakes, or volcanic activities. The seismic design criteria requires mounting a sprinkler mounting instrument to a support fixed to a building so as to minimize the movement of a sprinkler in the building due to vibration of a fire suppression pipe of a building during a natural disaster.

In this case, the sprinkler mounting instrument allows a reducer positioned on the sprinkler to contact with the support so as to indirectly mount the sprinkler to the support. Meanwhile, the sprinkler mounting instrument is disclosed as a conventional art titled "Apparatus for mounting sprinkler and sprinkler having the same" in Korean Patent Application Publication No. 10-2012-0032337. The apparatus for mounting sprinkler surrounds a sprinkler combining instrument (a sprinkler reducer).

Here, the sprinkler mounting apparatus has a center bracket and a support. The center bracket includes a bracket body, a cover, and a push module. The cover is hinged to a side part of the bracket body, and the push module is screwed to the cover. Before the cover covers the bracket body, the sprinkler combining instrument is inserted into an insert groove of the bracket body.

When the cover covers the bracket body, the push module is used to insert a support rod supported by the cover into the bracket body, and passes through the bracket body and the support rod by using a guide rod. That is, the guide rod is inserted into a guide groove of the bracket body. However, while the cover covers the bracket body, the push module has a structure whereby it is difficult to push the sprinkler combining instrument toward the support due to a shape of the bracket body and a diameter of the sprinkler combining instrument.

When the cover covers the bracket body, a length of the push module is restricted by contact of the cover with the bracket body and by contact of the cover with the sprinkler combining instrument, so that the length of the push module is not increased or decreased in the bracket body. Furthermore, before the cover covers the bracket body, the length of the push module is required to be adjusted according to change of a size of the sprinkler combining instrument. In addition, since the push module is fitted to the guide groove of the bracket body, during vibration of a building, the push module is easily spaced apart from the bracket body, and thus the support and the sprinkler combining instrument are separated from each other.

SUMMARY OF THE INVENTION

Accordingly, the present invention has been made keeping in mind the above problems occurring in the related art, and the present invention is intended to propose a tube locking and releasing device for a fire suppression system, whereby a reducer due to ring-shaped outer surfaces thereof is prevented from rotating idly, a close contact force of a support tube with narrow areas of the ring-shaped outer surfaces of the reducer is increased regardless of a diameter of the reducer, and separation of the reducer from the support tube is restrained by using a one-touch method during vibration of a building so as to minimize working time in bringing the reducer into close contact with the support tube.

In order to achieve the above object, according to one aspect of the present invention, there is provided a tube locking and releasing device, the device including: a tube seating structure including: a seating bottom extending in a predetermined width in a direction; and opposing seating walls standing to face each other on opposite edges of the seating bottom, each of the seating walls being open at an upper side thereof and having a curved shape defined from the upper side toward a lower side thereof; a tube covering structure including: opposing cover walls provided so as to intermittently cover an outer surface of the upper side of the seating wall, a first side part of each of the cover walls being hinged to the seating wall; and a cover ceiling provided above each of the seating walls, the cover ceiling connecting the cover walls to each other; a tube fixing structure including: a handle fixing part positioned between the cover walls at a second side part of the cover wall, the handle fixing part being hinged to each of the cover walls and being intermittently locked to each of the seating walls; and a handle press part protruding from the handle fixing part thereon so as to be bent; and a tube pressing structure being attached to/detached from the cover ceiling, the tube pressing structure protruding downward from the cover ceiling when being attached to the cover ceiling, wherein the tube seating structure, the tube covering structure, the tube fixing structure, and the tube pressing structure surround a support tube fixed to a building and a reducer positioned on a sprinkler, the reducer being in close contact with the support tube, and the tube covering structure includes a friction applying wing comprised of a single body or gear tooth shaped contact portions, which contact with the reducer.

Each of the seating walls may include a seating groove corresponding to the curved shape at a middle area thereof, wherein the seating wall may have two friction wings facing each other along a circumference of the seating groove and an elasticity band along the circumference of the seating groove at an opposite side of an entrance of the seating groove.

The seating wall may have opposite end parts in the vicinity of the entrance of the seating groove due to a bow shape of the seating wall, wherein when the outer surface of the seating wall is seen, a first end part of the opposite end parts of the seating wall may have a relatively straight shape compared to a second end part thereof and the second end part may have a step shape.

The seating wall may have opposite end parts in the vicinity of the entrance of the seating groove due to the bow shape of the seating wall and have an elasticity-support piece provided on a first end part of the seating wall, wherein the elasticity-support piece may be positioned at the same level as a level of an end of the elasticity band on the first end part and protrude from each of the seating walls toward a middle area positioned between the seating walls.

When seen from an area positioned between the seating walls on the seating bottom, the seating walls may be spaced apart from each other in the same width from a lower side of each of the seating walls toward the upper side thereof.

Each of the cover walls may include a cover groove provided thereon at the entrance of the seating groove of each of the seating walls, wherein the cover groove may have the friction applying wing comprised of a single body on a circumference thereof, the friction applying wing facing an area positioned between the two friction wings.

Each of the cover walls may include a cover groove provided thereon at the entrance of the seating groove of each of the seating walls, wherein the cover groove may include the gear tooth shaped contact portions on a circumference thereof, the gear tooth shaped contact portions facing an area positioned between the two friction wings.

The gear tooth shaped contact portions may include: first contact protrusions provided on a middle area of the circumference of the cover groove, the first contact protrusions having press protrusions toward a center of an arc of the cover groove; and second and third contact protrusions provided on opposite edges of the circumference of the cover groove, the second and third contact protrusions having press protrusions facing each other.

When seen relative to the seating bottom, the first side part of each of the cover walls may be positioned at a level higher than a level of the second side part of each of the cover walls, and when each of the cover walls covers the outer surface of each of the seating walls, the first side part of each of the cover walls may be spaced apart from the elasticity band of each of the seating walls, and the second side part of each of the cover walls may be in contact with the elasticity band of each of the seating walls.

A cover hole of the first side part of each of the cover walls may be hinged to a seating hole of a first end of each of the seating walls by a first hinge rivet, and when each of the cover walls covers the outer surface of each of the seating walls, a second hinge rivet may pass through a cover hole of the second side part of each of the cover walls such that the second hinge rivet is supported by a step shaped structure of the second end part of each of the seating walls.

When the cover ceiling covers the outer surface of each of the seating walls in cooperation with each of the cover walls, the cover ceiling may have a first pair of holding protrusions, a pressing means, and a second pair of holding protrusions consecutively positioned thereon from the first end part of each of the seating walls toward the second end part of each of the seating walls.

The first pair of holding protrusions may protrude from opposite edges of a ceiling holding hole positioned immediately above the first end part of each of the seating walls toward an area positioned between the seating walls and bend toward each other.

When seen from an outer surface of the cover ceiling, the pressing means may be formed by being depressed in a slot shape with a bulging center from the outer surface of the cover ceiling toward an inner surface thereof so as to have a thick width at a middle area thereof and thin widths on opposite edges thereof, wherein a press hole may be provided at the middle area of the slot shape with a bulging center The second pair of holding protrusions may protrude from opposite edges of a ceiling holding hole positioned immediately above the second end part of each of the seating walls toward an area positioned between the seating walls and bend toward each other.

When seen from an area positioned between the seating walls, the handle fixing part and the handle press part may have depressions defined along inner surfaces of the tube fixing structure, expose the inner surfaces of the tube fixing structure to an outside of each of the seating walls, and have predetermined angles to each other.

When seen from the outer surface of the cover ceiling, each of the seating walls and each of the cover walls may be exposed to an outside of the cover ceiling at the second side part of the cover wall such that the handle fixing part is positioned at a dummy hole of the cover ceiling.

The handle fixing part may have a handle fixing upper part between the cover walls and between the seating walls, have a handle fixing lower part between the seating walls, and have an elasticity-applying groove band thereon, the elasticity-applying groove band giving elasticity to movement of the handle fixing lower part relative to the handle fixing upper part.

The handle fixing upper part between the cover walls may have a combination hole provided thereon, and the second hinge rivet may pass through the combination hole such that the handle fixing upper part is hinged to the cover walls.

The handle fixing upper part and the handle fixing lower part may have first to third open parts consecutively defined at areas positioned between the handle fixing upper part and the handle fixing lower part so as to hold a lock rivet connecting the seating walls to each other under the second side part of each of the cover walls and allow the lock rivet to intermittently contact with the first open part and the second open part.

The handle fixing lower part, which is positioned under the handle fixing upper part, and the handle fixing upper part may have open ring shapes on one sides thereof and be provided to be integral to each other, wherein when a lock rivet connecting the seating walls to each other is held between the handle fixing upper part and the handle fixing lower part, the handle fixing lower part may move relatively to the handle fixing upper part.

When seen from open directions of the handle fixing upper part and the handle fixing lower part, the handle fixing lower part may be arranged so as to be vertical to the handle fixing upper part when the handle fixing part is locked to each of the seating walls, so that the handle fixing lower part between the seating walls may be spaced apart from the reducer.

The elasticity-applying groove band may be positioned on outer surfaces facing each other of the handle fixing upper part and the handle fixing lower part so as to have a jaw shape and protrude from the outer surfaces of the handle fixing part toward inner surfaces thereof.

Each of the seating walls and each of the cover walls may be hinged to each other by a first hinge rivet at a first end of each of the seating walls, and a spring may be wound on the first hinge rivet, wherein a first end of the spring may be in contact with the elasticity-support piece and a second end of the spring may be in contact with the cover ceiling.

The tube pressing structure may bend downward from opposite end parts of the outer surface of the cover ceiling toward an intermediate area thereof between each of the seating walls and between each of the cover walls so as to have a thin plate spring shape, and when seen from an inner surface of the cover ceiling, the tube pressing structure may include a rectangular shaped spring frame provided at a middle area thereof and opposite holding pieces provided on opposite edges thereof, each of the holding pieces protruding from the spring frame toward an outside of the spring frame, wherein an occupying area of each of the holding pieces may be smaller than an occupying area of the spring frame between the seating walls.

One holding piece of the opposite holding pieces may be held by the first pair of holding protrusions on the cover ceiling, and the remaining holding piece thereof may be held by the second pair of holding protrusions; and the spring frame may be bent toward an area positioned under the cover ceiling from the opposite holding pieces so as to have a bow shape, wherein when the handle fixing part is locked to each of the seating walls, the spring frame may push the reducer so as to bring the reducer into close contact with the support tube.

The tube pressing structure may protrude downward from the cover ceiling between each of the seating walls and between each of the cover walls so as to have a knob shaped elastic body and include a cube-shaped rubber elastic body and a rubber fitting part provided on the rubber elastic body to be integral thereto, the rubber elastic body and the rubber fitting part being consecutively arranged from an area positioned under an inner surface of the cover ceiling toward the outer surface thereof, wherein an occupying volume of the rubber fitting part may be smaller than an occupying volume of the rubber elastic body between the seating walls.

The rubber fitting part may include: a rubber fitting neck fitted to the press hole of the pressing means on the cover ceiling; and a rubber fitting head provided on the rubber fitting neck, the rubber fitting head having a size larger than a size of the rubber fitting neck and being exposed to the outer surface of the cover ceiling, and the rubber elastic body under the rubber fitting neck may protrude downward between the seating walls, and when the handle fixing part is locked to each of the seating walls, the rubber elastic body may push the reducer so as to bring the reducer into close contact with the support tube.

According to the present invention, there are provided the opposing seating walls on the tube seating structure, each of the seating walls having the friction wings in the vicinity of the seating groove thereof; the friction applying wing in the vicinity of the cover groove of each of the cover walls of the tube covering structure; and the tube pressing structure whereby while the seating walls surround the reducer and the support tube, the friction wings and the friction applying wing sufficiently match angular outer surfaces of a ring shape of the reducer, and the tube pressing structure elastically contacts with the angular outer surfaces of a ring shape of the reducer, so that the reducer is prevented from rotating idly relative to the seating walls during vibration of a building.

According to the present invention, there are provided the seating walls on the tube seating structure, each of the seating walls including the friction wings in the vicinity of the seating groove, the gear tooth shaped contact portions on the cover groove of each of the cover walls on the tube covering structure, and the tube pressing structure, whereby while each of the seating walls surrounds the reducer and the support tube, the friction wings and the contact protrusions contact with ring-shaped outer surfaces and angular outer surfaces of a ring shape of the reducer, and the tube pressing structure elastically contacts with the ring-shaped outer surfaces or the angular outer surfaces of a ring shape of the reducer, so that the reducer is prevented from rotating idly relative to the seating walls during vibration of a building.

According to the present invention, there are provided the seating walls on the tube seating structure, the cover ceiling on the tube covering structure, the handle fixing part of the tube fixing structure, and the tube pressing structure, whereby while the seating walls, the cover ceiling, and the handle fixing part surround the reducer and the support tube, the tube pressing structure attached to the cover ceiling pushes the reducer toward the support tube so as to bring the reducer into elastic contact with the support tube, so that the reducer and the support tube are brought into close contact with each other between the tube seating structure, the tube covering structure, the tube fixing structure, and the tube pressing structure regardless of the reducer.

According to the present invention, there are provided the seating walls on the tube seating structure, the cover ceiling on the tube covering structure, and the handle fixing part and the handle press part of the tube fixing structure, whereby while the seating walls and the cover ceiling surround the reducer and the support tube, the handle fixing part and the handle press part provided to be integral to each other between the seating walls are hinged to the seating walls, so that while the handle fixing part and the handle press part rotate relative the seating walls, the handle fixing part is used to securely hold the lock rivet in a one-touch method, which connects the seating walls, and accordingly, the reducer and the support tube are restrained from being separated from the tube seating structure and the tube covering structure during vibration of a building.

According to the present invention, there are provided the tube seating structure, the tube covering structure, and the tube fixing structure, whereby the tube covering structure is hinged to the tube seating structure and the tube fixing structure is hinged to the tube covering structure, so that while the tube seating structure, the tube covering structure, the tube fixing structure surround the reducer and the support tube, or while the reducer and the support tube are separated from the tube seating structure, the tube covering structure, and the tube fixing structure, only rotations of the tube covering structure and the tube fixing structure are required relative to the tube seating structure, which minimizes working time required to bring the reducer into close contact with the support tube.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
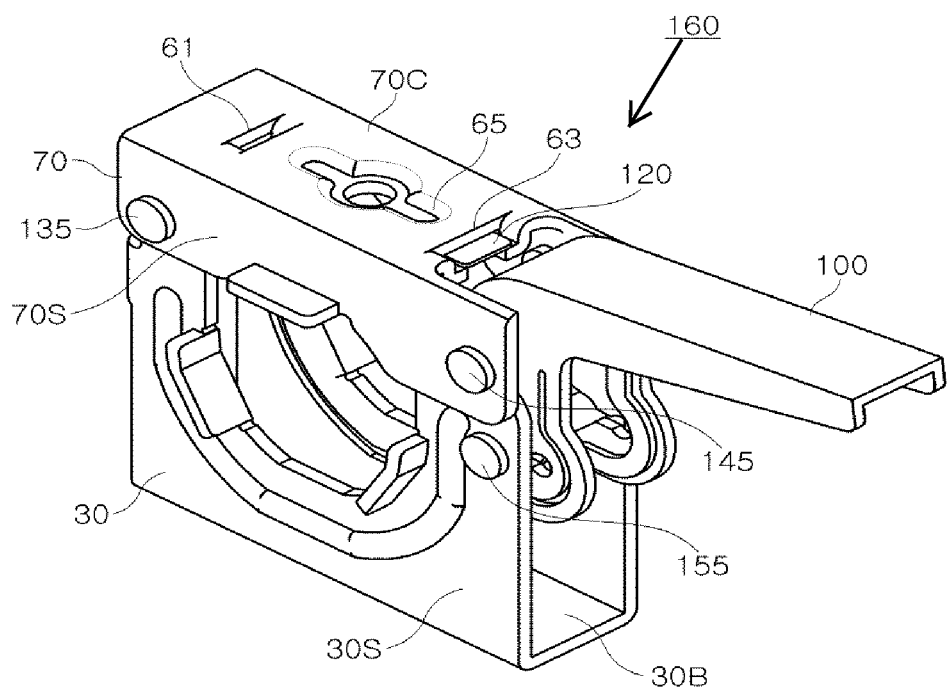
FIG. 1 is a perspective view showing a tube locking and releasing device for a fire suppression system according to a first embodiment of the present invention.

Embodiments of the present invention will be described in detail with reference to the accompanying drawings. These embodiments will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, the detailed description provided below should not be construed as being restrictive. In addition, the scope of the present invention is defined only by the accompanying claims and their equivalents if appropriate. In the drawings, like reference numerals refer to the same or similar functions, and lengths, areas, and thickness of the elements shown in the drawings and the shape thereof may be exaggeratedly drawn for the sake of convenience.

Hereinbelow, the exemplary embodiments of the present invention will be described in detail with reference to the accompanying drawings such that the invention can be easily embodied by those skilled in the art to which this invention belongs.

Figure 2A:
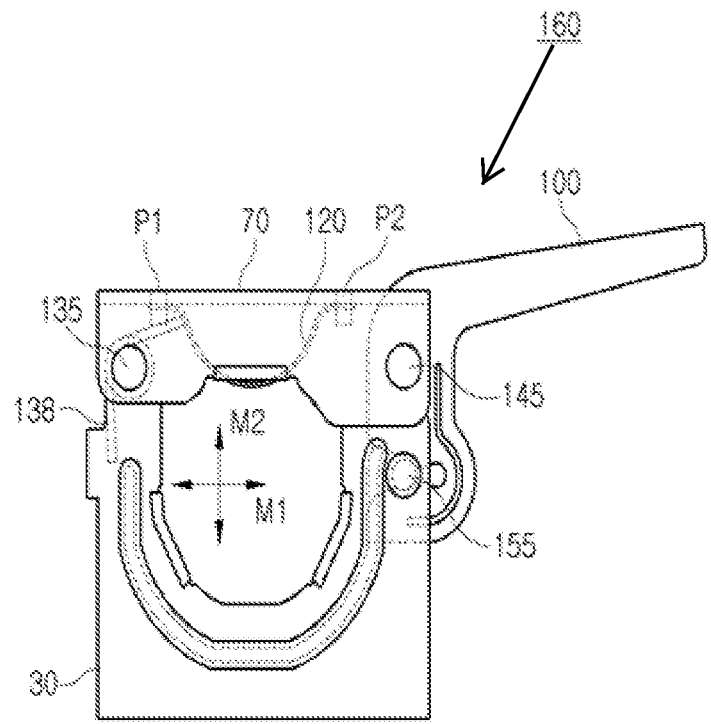
FIGS. 2A and 2B are a front view and a side view of the tube locking and releasing device for a fire suppression system of FIG. 1, respectively.
Figure 2B:
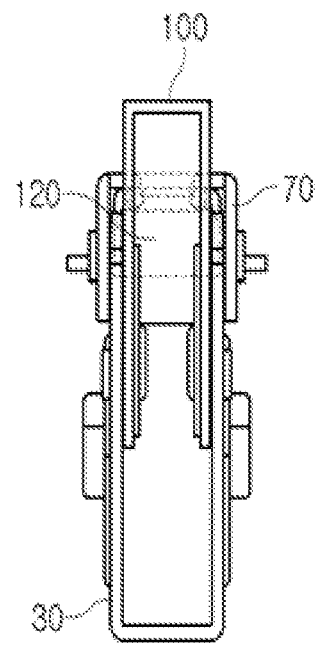
Figure 3A:
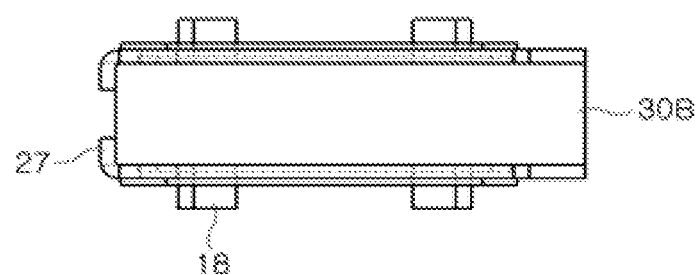
FIGS. 3A, 3B, and 3C are a top plan view, a front view, and a side view of a tube seating structure, respectively, in the tube locking and releasing device for a fire suppression system of FIGS. 2A and 2B.
Figure 3B:
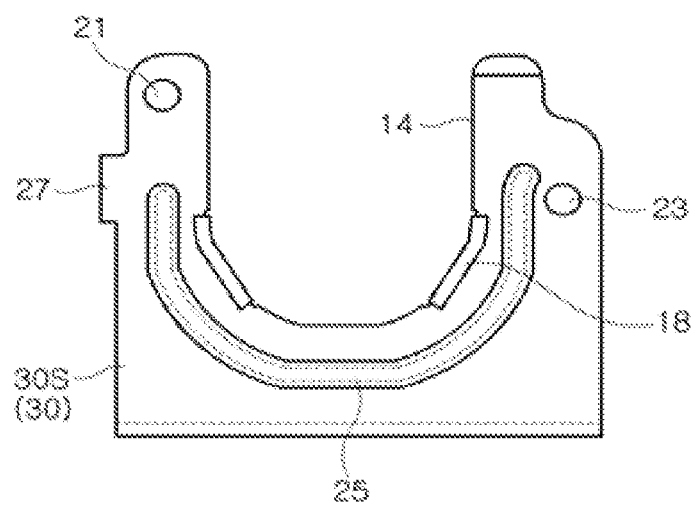
Figure 3C:
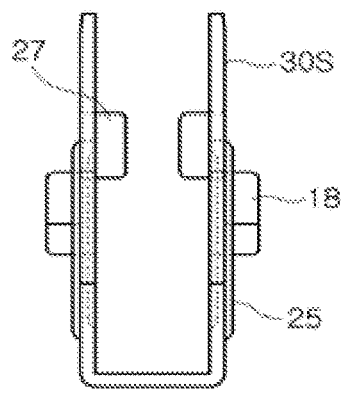

FIG. 1 is a perspective view showing a tube locking and releasing device for a fire suppression system according to a first embodiment of the present invention; FIGS. 2A and 2B are a front view and a side view of the tube locking and releasing device for a fire suppression system of FIG. 1, respectively; and FIGS. 3A, 3B, and 3C are a top plan view, a front view, and a side view of a tube seating structure, respectively, in the tube locking and releasing device for a fire suppression system of FIGS. 2A and 2B.

Figure 4A:
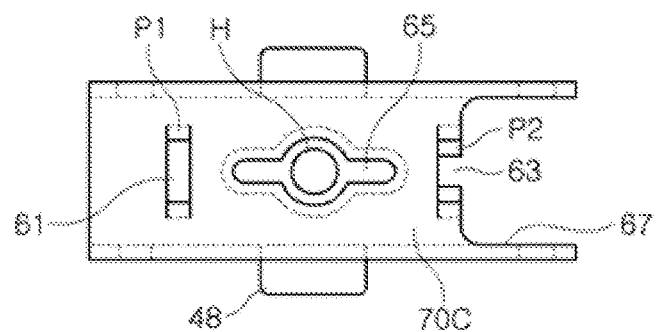
FIGS. 4A, 4B, and 4C are a top plan view, a front view, and a side view of a tube covering structure, respectively, in the tube locking and releasing device for a fire suppression system of FIGS. 2A and 2B.
Figure 4B:
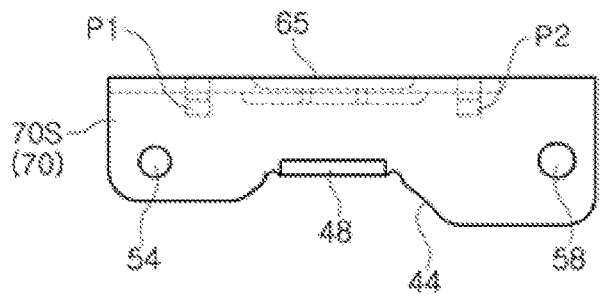
Figure 4C:
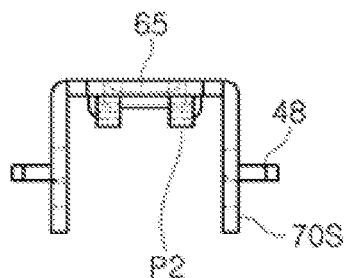
Figure 5A:
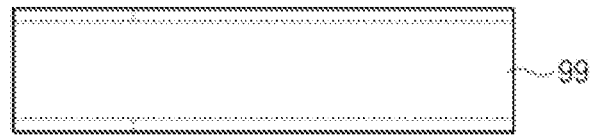
FIGS. 5A, 5B, and 5C are a top plan view, a front view, and a side view of a tube fixing structure, respectively, in the tube locking and releasing device for a fire suppression system of FIGS. 2A and 2B.
Figure 5B:
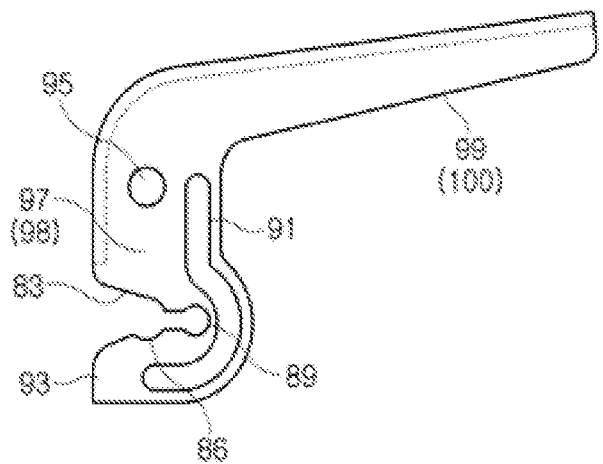
Figure 5C:
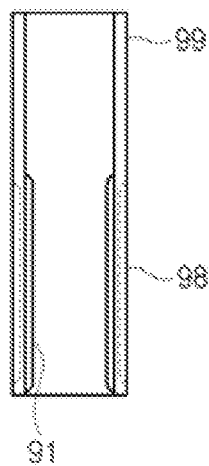
Figure 6A:
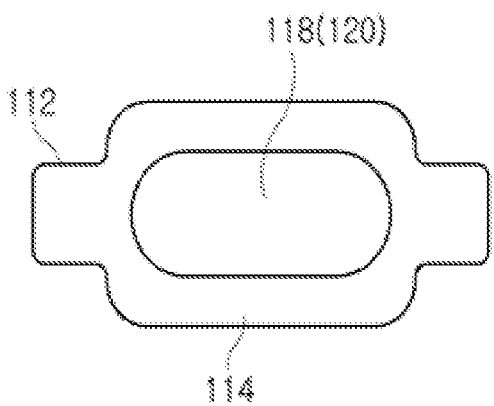
FIGS. 6A, 6B, and 6C are a top plan view, a front view, and a side view of a tube pressing structure, respectively, in the tube locking and releasing device for a fire suppression system of FIGS. 2A and 2B according to the first embodiment.
Figure 6B:
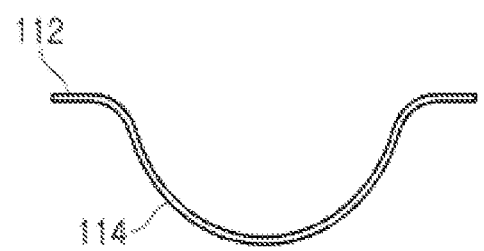
Figure 6C:
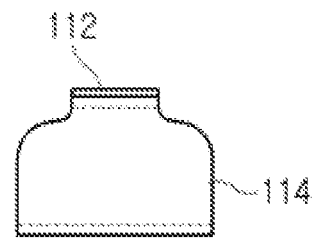

In addition, FIGS. 4A, 4B, and 4C are a top plan view, a front view, and a side view of a tube covering structure, respectively, in the tube locking and releasing device for a fire suppression system of FIGS. 2A and 2B; FIGS. 5A, 5B, and 5C are a top plan view, a front view, and a side view of a tube fixing structure, respectively, in the tube locking and releasing device for a fire suppression system of FIGS. 2A and 2B; and FIGS. 6A, 6B, and 6C are a top plan view, a front view, and a side view of a tube pressing structure, respectively, in the tube locking and releasing device for a fire suppression system of FIGS. 2A and 2B according to the first embodiment.

Figure 7A:
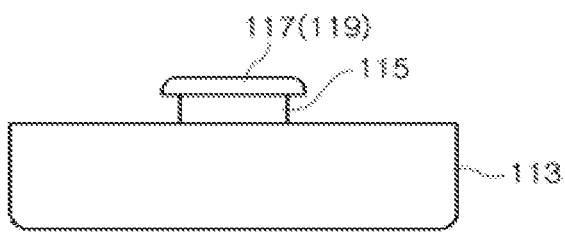
FIGS. 7A and 7B are a front view and a top plan view of a tube pressing structure, respectively, in the tube locking and releasing device for a fire suppression system of FIGS. 2A and 2B according to a second embodiment.
Figure 7B:
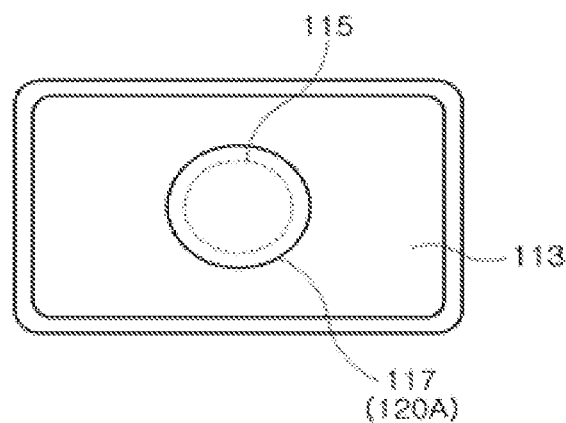
Figure 8A:
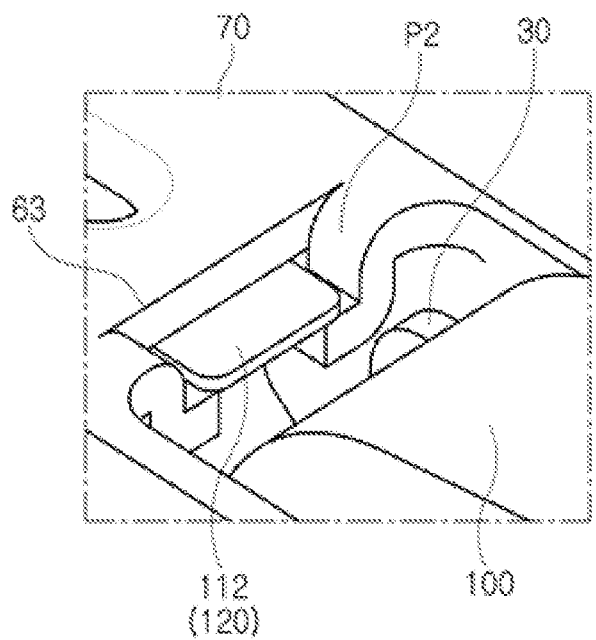
FIGS. 8A and 8B are detailed views of the tube pressing structure and an elastic body, respectively, in the tube locking and releasing device for a fire suppression system of FIG. 1.
Figure 8B:
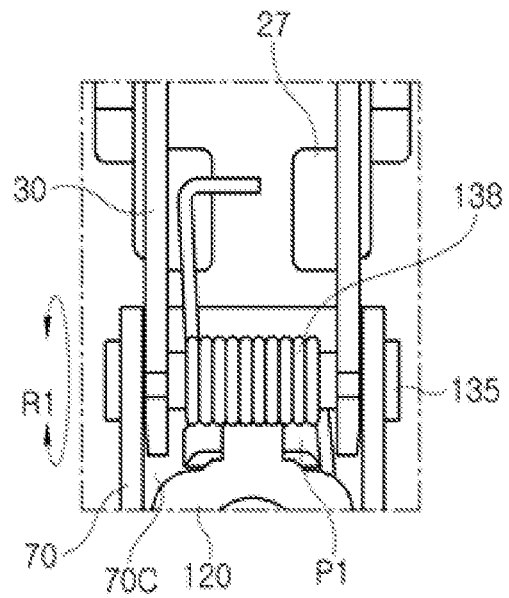
Figure 9:
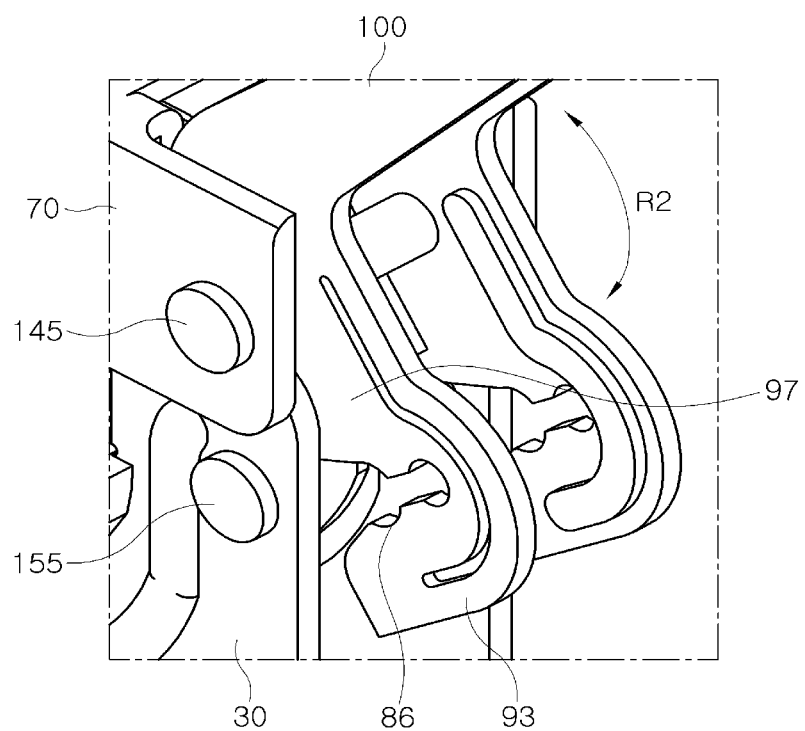
FIG. 9 is an enlarged view of a combined state of the tube covering structure and the tube fixing structure the tube locking and releasing device for a fire suppression system of FIG. 1.

Furthermore, FIGS. 7A and 7B are a front view and a top plan view of a tube pressing structure, respectively, in the tube locking and releasing device for a fire suppression system of FIGS. 2A and 2B according to a second embodiment; FIGS. 8A and 8B are detailed views of the tube pressing structure and an elastic body, respectively, in the tube locking and releasing device for a fire suppression system of FIG. 1; and FIG. 9 is an enlarged view of a combined state of the tube covering structure and the tube fixing structure the tube locking and releasing device for a fire suppression system of FIG. 1.

Referring to FIG. 1, the tube locking and releasing device 160 for a fire suppression system according to the present invention includes the tube seating structure 30, the tube covering structure 70, the tube fixing structure 100, and the tube pressing structure 120. The tube seating structure 30, the tube covering structure 70, the tube fixing structure 100, and the tube pressing structure 120 surround a support tube 180 of FIG. 16 fixed to a building (not shown) and a reducer 200 of FIG. 16 positioned on a sprinkler (not shown), the reducer being in close contact with the support tube 180.

Referring to FIGS. 1 to 3, the tube seating structure 30 includes a seating bottom 30B and opposing seating walls 30S. The seating bottom 30B extends in a predetermined width in a direction. More particularly, the seating bottom 30B is configured to have a rectangular shape. Each of the opposing seating walls 30S is standing to face each other on opposite edges of the seating bottom 30B, wherein the opposing seating wall 30S is open at an upper side thereof and has a curved shape defined from the upper side toward a lower side thereof as shown in FIG. 3B.

Here, as shown in FIG. 3B, each of the seating walls 30S includes a seating groove 14 corresponding to the curved shape at a middle area thereof, wherein the seating wall 30S has two friction wings 18 facing each other along a circumference of the seating groove 14 and an elasticity band 25 along the circumference of the seating groove 14 at an opposite side of an entrance of the seating groove 14. The seating wall 30S has opposite end parts in the vicinity of the entrance of the seating groove 14 due to a bow shape of the seating wall, and as shown in FIG. 3B, as for an outer surface of the seating wall 30S, a first end part of the opposite end parts of the seating wall 30S has a relatively straight shape compared to a second end part thereof and the second end part has a step shape.

Accordingly, the first end part of each of the seating walls 30S has an area smaller than an area of the second end part thereof. Each of the seating walls 30S has a seating hole 21 and a seating hole 23 provided on a first end and a second end, respectively. Here, the seating wall 30S has the opposite end parts in the vicinity of the entrance of the seating groove 14 due to the bow shape of the seating wall and has an elasticity-support piece 27 provided on the first end part, wherein the elasticity-support piece 27 is positioned at the same level as a level of an end of the elasticity band 25 and protrudes from each of the seating walls 30S toward a middle area positioned between the seating walls 30S as shown in FIG. 3B.

Referring to FIGS. 1 to 4, the tube covering structure 70 includes opposing cover walls 70S and a cover ceiling 70C. A first side part of each of the cover walls 70S is hinged to each of the seating walls 30S on the upper side of the opposing seating wall 30S so as to intermittently cover the outer surface of each of the seating walls 30S as shown in FIG. 1 or FIG. 2A. More particularly, each of the cover walls 70S includes a cover groove 44 provided thereon at the entrance of the seating groove 14 of each of the seating walls 30S, wherein the cover groove 44 includes a friction applying wing 48 comprised of a single body on a circumference thereof, the friction applying wing 48 facing an area positioned between the two friction wings 18 of FIG. 3B.

When each of the cover walls 70S is seen from the seating bottom 30B of FIG. 1 or FIG. 3A, the first side part of each of the cover walls 70S is positioned at a level higher than a level of a second side part of each of the cover walls 70S, and as shown in FIG. 1 or FIG. 2A, when the opposing cover wall covers the outer surface of each of the seating walls 30S, the first side part of each of the cover walls 70S is spaced apart from the elasticity band 25 of each of the seating walls 30S and the second side part of each of the cover walls 70S contacts with the elasticity band 25 of each of the seating walls 30S.

A cover hole 54 of FIG. 4B of the first side part of each of the cover walls 70S is hinged to the seating hole 21 of FIG. 3B of the first end of each of the seating walls 30S by a first hinge rivet 135 of FIG. 1, and when each of the cover walls 70S covers the outer surface of each of the seating walls 30S, a second hinge rivet 145 passes through a cover hole 58 of FIG. 4B of the second side part of each of the cover walls 70S such that the second hinge rivet 145 is supported by a step-shaped structure of the second end part of each of the seating walls 30S as shown in FIG. 1 or FIG. 2A.

The cover ceiling 70C above each of the seating walls 30S connects the cover walls 70S to each other. More particularly, when the cover ceiling 70C covers the outer surface of each of the seating walls 30S in cooperation with each of the cover walls 70S, the cover ceiling 70C has a first pair of holding protrusions P1, a pressing means 65, and a second pair of holding protrusions P2 consecutively positioned from the first end part of each of the seating walls 30S toward the second end part of each of the seating walls 30S. The first pair of holding protrusions P1 has the same shape as the second pair of holding protrusions P2 as shown in FIG. 8A.

The first pair of holding protrusions P1 protrude from opposite edges of a ceiling holding hole 61 positioned immediately above the first end part of each of the seating walls 30S toward an area positioned between the seating walls 30S and bend toward each other. When seen from an outer surface of the cover ceiling 70C, the pressing means 65 is formed by being depressed in a slot shape with a bulging center from the outer surface of the cover ceiling 70C toward an inner surface thereof so as to have a thick width at a middle area thereof and thin widths on opposite edges thereof, wherein a press hole H is provided at the middle area of the slot shape with a bulging center.

In addition, the second pair of holding protrusions P2 protrude from opposite edges of the ceiling holding hole 63 positioned immediately above the second end part of each of the seating walls 30S toward an area positioned between the seating walls 30S and bend toward each other.

Referring to FIGS. 1 to 5, the tube fixing structure includes a handle fixing part 98 and a handle press part 99. When seen from an area positioned between the seating walls 30S, the handle fixing part 98 and the handle press part 99 have depressions defined along inner surfaces of the tube fixing structure 100, expose the inner surfaces of the tube fixing structure 100 to an outside of each of the seating walls 30S, and have predetermined angles to each other. Here, the handle fixing part 98 is positioned between the cover walls 70S at the second side part of the cover walls 70S so as to be hinged to each of the cover walls 70S and be intermittently locked to each of the seating walls 30S.

More particularly, when seen from the outer surface of the cover ceiling 70C, each of the seating walls 30S and each of the cover walls 70S are exposed to an outside of the cover ceiling 70C at the second side part of the cover wall such that the handle fixing part 98 is positioned at a dummy hole 67 of FIG. 4A of the cover ceiling 70C as shown in FIG. 1 or FIG. 2A. The handle fixing part 98 has a handle fixing upper part 97 between the cover walls 70S and between the seating walls 30S, has a handle fixing lower part 93 between the seating walls 30S, and has an elasticity-applying groove band 91 thereon, the elasticity-applying groove band giving elasticity to movement of the handle fixing lower part 93 relative to the handle fixing upper part 97.

Here, the handle fixing upper part 97 between the cover walls 70S has a combination hole 95 provided thereon, and the second hinge rivet 145 of FIG. 1 or FIG. 2A passes through the combination hole 95 such that the handle fixing upper part is hinged to the cover walls 70S. The handle fixing upper part 97 and the handle fixing lower part 93 have first to third open parts 83, 86, and 89 consecutively defined at areas positioned between the handle fixing upper part 97 and the handle fixing lower part 93 so as to hold a lock rivet 155 of FIG. 1 or FIG. 2A connecting the seating walls 30S to each other under the second side part of each of the cover walls 70S and allow the lock rivet 155 to intermittently contact with the first open part 83 and the second open part 86.

When the lock rivet 155 is completely fitted to the second open part 86 in cooperation with the first open part 83, the handle fixing part 98 does not allow a position of the lock rivet 155 to freely move between the first open part 83 and the second open part 86 due to a step between the first open part 83 and the second open part 86 when an external force is not applied to the handle fixing part. The handle fixing lower part 93, which is positioned under the handle fixing upper part 97, and the handle fixing upper part 97 have open ring shapes 83, 86, and 89 on one sides thereof and are provided to be integral to each other, wherein when the lock rivet 155 connecting the seating walls 30S to each other is held between the handle fixing upper part 97 and the handle fixing lower part 93, the handle fixing lower part 93 moves relatively to the handle fixing upper part 97.

When seen from open directions of the handle fixing upper part 97 and the handle fixing lower part 93, the handle fixing lower part 93 is arranged so as to be vertical to the handle fixing upper part 97 when the handle fixing part 98 is locked to each of the seating walls 30S, so that the handle fixing lower part between the seating walls 30S is spaced apart from the reducer 200 as shown in FIG. 1 or FIG. 2A. The elasticity-applying groove band 91 is positioned on outer surfaces facing each other of the handle fixing upper part 97 and the handle fixing lower part 93 so as to have a jaw shape and protrudes from the outer surfaces of the handle fixing part 98 toward inner surfaces thereof. The elasticity-applying groove band 91 restores deformed shapes of the handle fixing upper part 97 and the handle fixing lower part 93 to initial shapes of the handle fixing upper part 97 and the handle fixing lower part 93.

Meanwhile, the handle press part 99 protrudes from the handle fixing part 98 so as to bend on the handle fixing part 99. An external force from an outside of the tube fixing structure 100 may be applied to the handle press part 99.

Referring to FIGS. 1 to 7B, as shown in FIGS. 1 and 4C, the tube pressing structure, which is 120 of FIG. 6A, or 120A of FIG. 7B, is coupled to or decoupled from the cover ceiling 70C, and when the tube pressing structure is coupled to the cover ceiling 70C, the tube pressing structure bends downward from the cover walls 70S. More particularly, the tube pressing structure 120 of FIG. 6A bends downward from opposite end parts of the outer surface of the cover ceiling 70C toward an intermediate area thereof between each of the seating walls 30S and between each of the cover walls 70S so as to have a thin plate spring shape, and when seen from the inner surface of the cover ceiling 70C, the tube pressing structure 120 has a spring frame 114 of a rectangular shape at a middle area thereof and tabs 112 on opposite edges thereof, the holding pieces protruding from the spring frame 114 toward opposite outsides of the spring frame 114.

Figure 17:
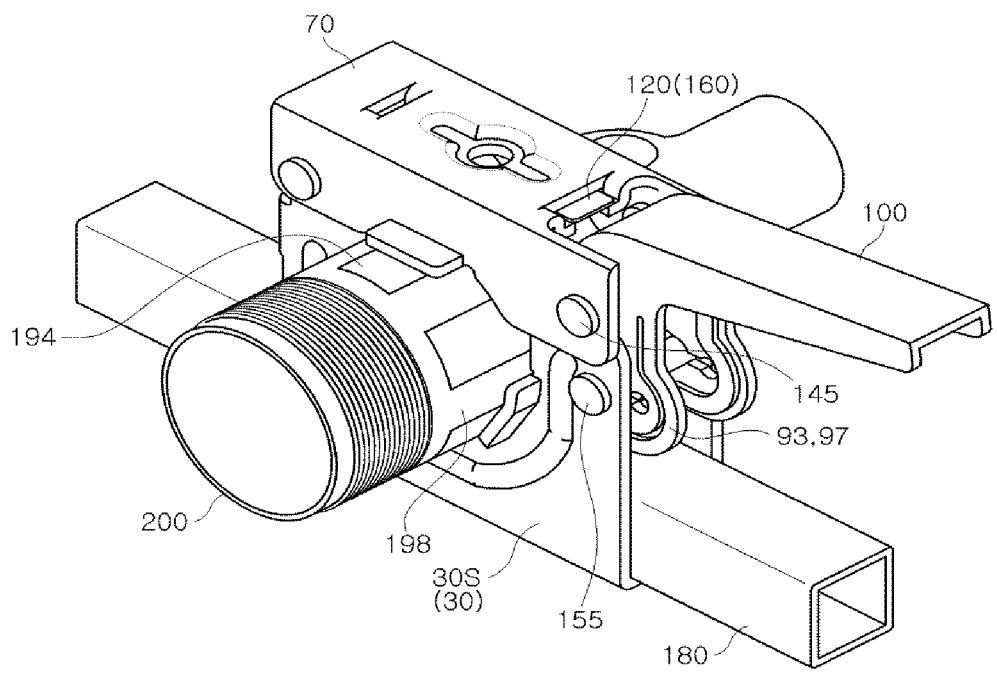

The spring frame 114 defines an open hole 118 at a middle area thereof. An area of each of the tabs 112 is smaller than an area of the spring frame 114 positioned between the seating walls 30S. As shown in FIG. 2A, one tab 112 is held by the first pair of holding protrusions P1 of FIG. 4A on the cover ceiling 70C, and the remaining tab 112 is held by the second pair of holding protrusions P2 of FIG. 4A. The spring frame 114 is bent toward an area positioned under the cover ceiling 70C from the opposite tabs 112 so as to have a bow shape, and as shown in FIG. 1, when the handle fixing part 98 of FIG. 5B is locked to each of the seating walls 30S, the spring frame 114 pushes the reducer 200 of FIG. 17 so as to bring the reducer 200 into close contact with the support tube 180 of FIG. 17.

In a different manner, the tube pressing structure 120A of FIG. 7B protrudes downward from the cover ceiling 70C between each of the seating walls 30S and between each of the cover walls 70S so as to have a knob shaped elastic body and includes a cube-shaped rubber elastic body 113 and a rubber fitting part 119 provided on the rubber elastic body 113 to be integral thereto, the rubber elastic body and the rubber fitting part being consecutively arranged from an area positioned under the inner surface of the cover ceiling 70C toward the outer surface thereof. An occupying volume of the rubber fitting part 119 is smaller than an occupying volume of the rubber elastic body 113 between the seating walls 30S. The rubber fitting part 119 includes: a rubber fitting neck 115 fitted to the press hole H of the pressing means 65 of FIG. 4A on the cover ceiling 70C; and a rubber fitting head 117 provided on the rubber fitting neck 115, the rubber fitting head having a size larger than a size of the rubber fitting neck 115 and being exposed to the outer surface of the cover ceiling 70C. The rubber elastic body 113 under the rubber fitting neck 115 protrudes downward between the seating walls 30S, and when the handle fixing part 98 is locked to each of the seating walls 30S, the rubber elastic body 113 pushes the reducer 200 so as to bring the reducer 200 into close contact with the support tube 180 as the spring frame 114 of FIG. 2A.

Referring to FIGS. 1 to 8B, as for the seating walls 30S of FIG. 3B and the cover walls 70S of FIG. 4B, each of the seating walls 30S and each of the cover walls 70S are hinged to each other by the first hinge rivet 135 of FIG. 1 at the first end of each of the seating walls 30S, and a spring 138 of FIG. 2A or FIG. 8B is wound on the first hinge rivet 135, wherein a first end of the spring 138 is in contact with the elasticity-support piece 27 and a second end of the spring 138 is in contact with the cover ceiling 70C as shown in FIG. 2A or FIG. 8B.

Here, while the cover walls 70S performs a first rotation R1 around the first hinge rivet 135 relative to the seating walls 30S, the spring 138 performs elastic motion between the seating walls 30S and the cover walls 70S.

Figure 16:
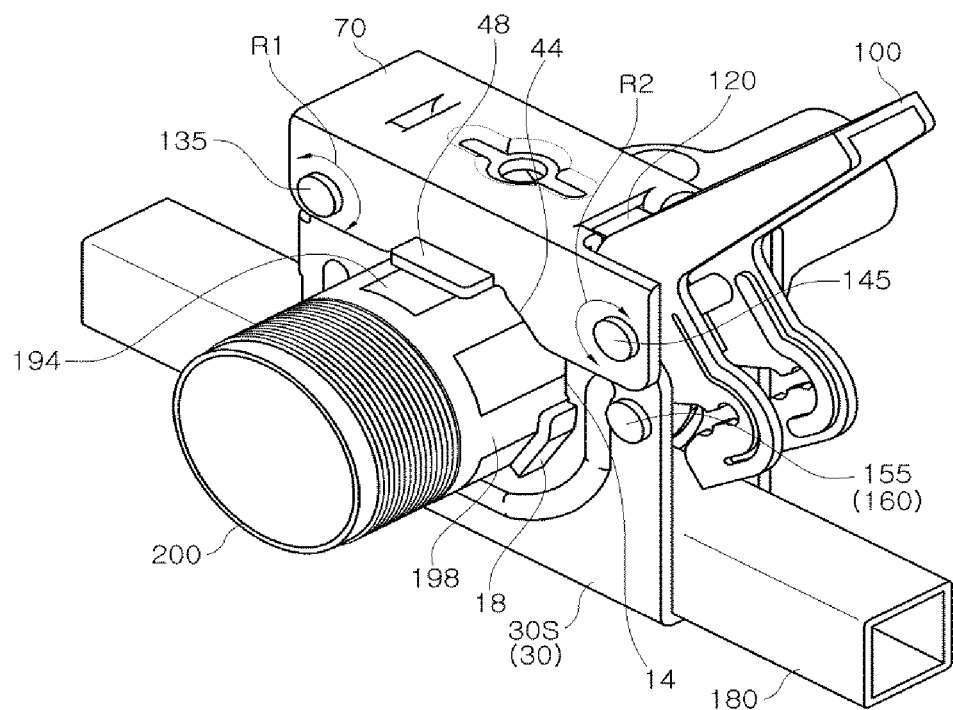

Referring to FIGS. 1 to 9, in the tube locking and releasing device for a fire suppression system 160, the tube covering structure 70 and the tube fixing structure 100 rotate relative to the tube seating structure 30 so as to surround the support tube 180 of FIG. 16 and the reducer 200 of FIG. 16. More particularly, to cover the seating walls 30S of the tube seating structure 30, the tube covering structure 70 performs the first rotation R1 of FIG. 8B of each of the cover walls 70S and the cover ceiling 70C around the first hinge rivet 135 relative to the seating walls 30S.

In addition, to secure a close contact force of each of the support tube 180, the tube seating structure 30, and the tube covering structure 70 with the reducer 200, the tube fixing structure 100 performs a second rotation R2 of each of the handle fixing part 98 and the handle press part 99 around the second hinge rivet 145 relative to the seating walls 30S. Here, the handle fixing part 98 may allow the second open part 86 to receive the lock rivet 155 by performing the second rotation R2 around the second hinge rivet 145.

Figure 10:
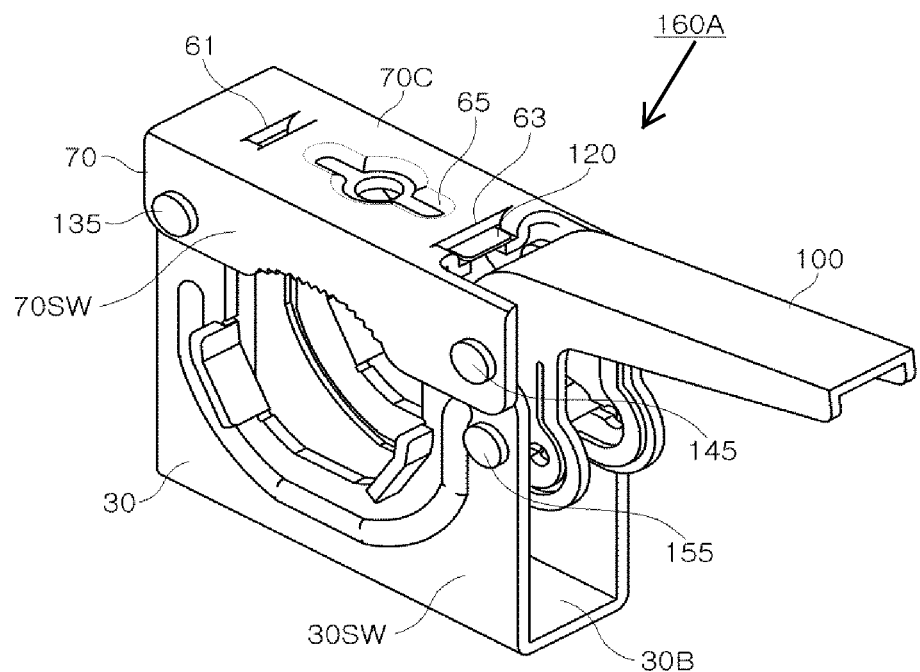
FIG. 10 is a perspective view showing a tube locking and releasing device for a fire suppression system according to the second embodiment of the present invention.
Figure 11A:
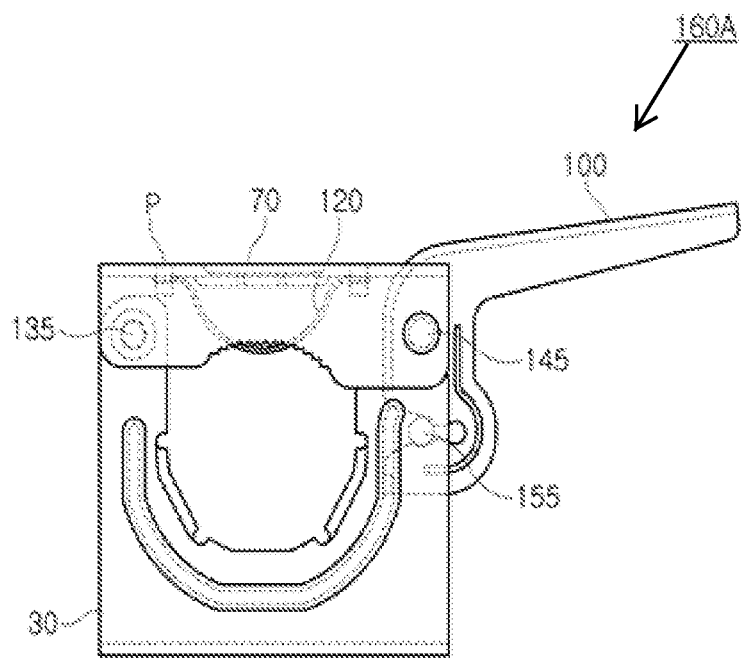
FIGS. 11A and 11B are a front view and a side view of the tube locking and releasing device for a fire suppression system of FIG. 10, respectively.
Figure 11B:
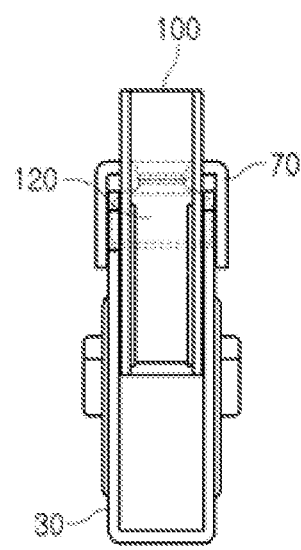
Figure 12A:
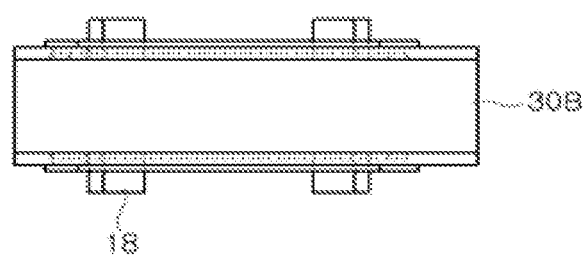
FIGS. 12A, 12B, and 12C are a top plan view, a front view, and a side view of a tube seating structure, respectively, in the tube locking and releasing device for a fire suppression system of FIG. 11A.
Figure 12B:
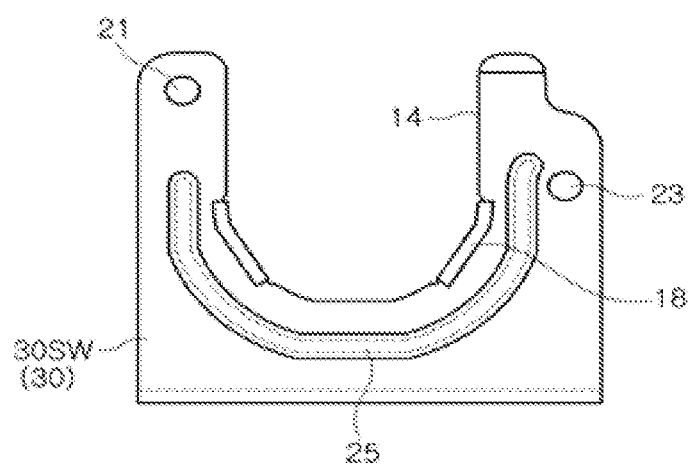
Figure 12C:
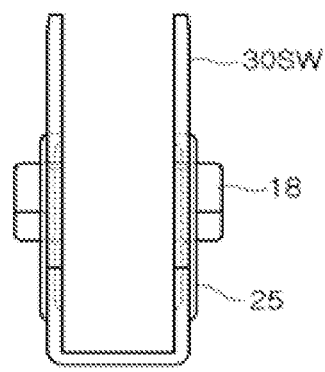

FIG. 10 is a perspective view showing a tube locking and releasing device for a fire suppression system according to the second embodiment of the present invention; FIGS. 11A and 11B are a front view and a side view of the tube locking and releasing device for a fire suppression system of FIG. 10, respectively; and FIGS. 12A, 12B, and 12C are a top plan view, a front view, and a side view of a tube seating structure, respectively, in the tube locking and releasing device for a fire suppression system of FIG. 11A.

Figure 13A:
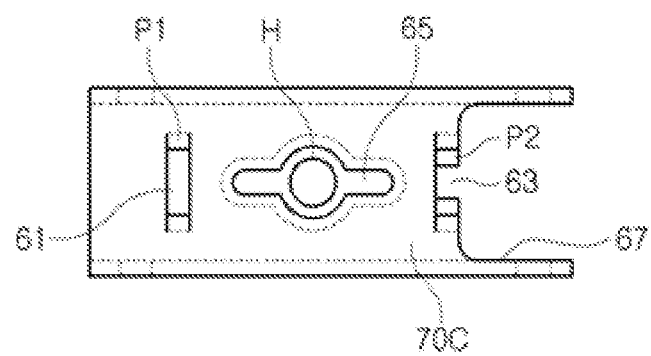
FIGS. 13A, 13B, and 13C are a top plan view, a front view, and a side view of a tube covering structure, respectively, in the tube locking and releasing device for a fire suppression system of FIG. 11A.
Figure 13B:
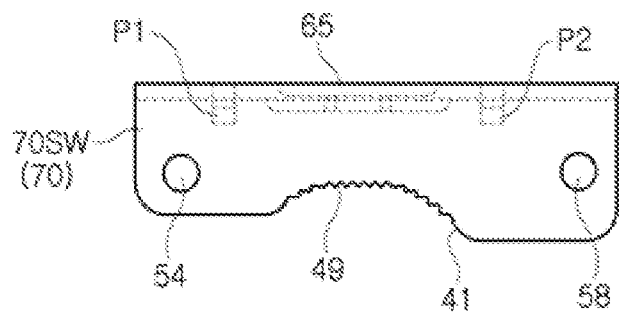
Figure 13C:
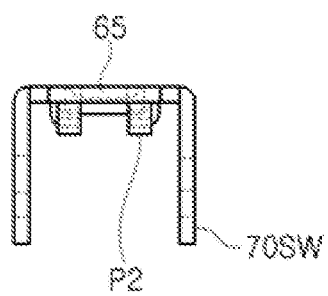
Figure 14:
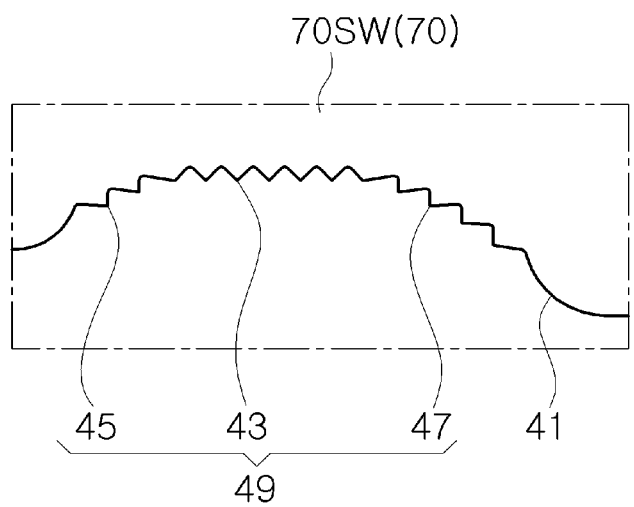
FIG. 14 is an enlarged view of gear tooth shaped contact portions on each of the cover walls in the tube covering structure of FIG. 13B.

FIGS. 13A, 13B, and 13C are a top plan view, a front view, and a side view of a tube covering structure, respectively, in the tube locking and releasing device for a fire suppression system of FIG. 11A; and FIG. 14 is an enlarged view of gear tooth shaped contact portions on each of the cover walls in the tube covering structure of FIG. 13B. FIGS. 10 to 14 will be described referring to FIGS. 1 to 9.

Referring to FIG. 10, the tube locking and releasing device 160A for a fire suppression system according to the present invention has a structure similar to a structure of the tube locking and releasing device 160 for a fire suppression system of FIG. 1, or FIGS. 2A and 2B. That is, the tube locking and releasing device for a fire suppression system 160A includes the tube seating structure 30, the tube covering structure 70, a tube fixing structure 100, and a tube pressing structure 120 as shown in FIG. 10. The tube seating structure 30, the tube covering structure 70, the tube fixing structure 100, and the tube pressing structure 120 surround a support tube 180 of FIG. 16 fixed to a building (not shown) and a reducer 200 of FIG. 16 positioned on a sprinkler (not shown), the reducer being in close contact with the support tube 180.

Figure 18:
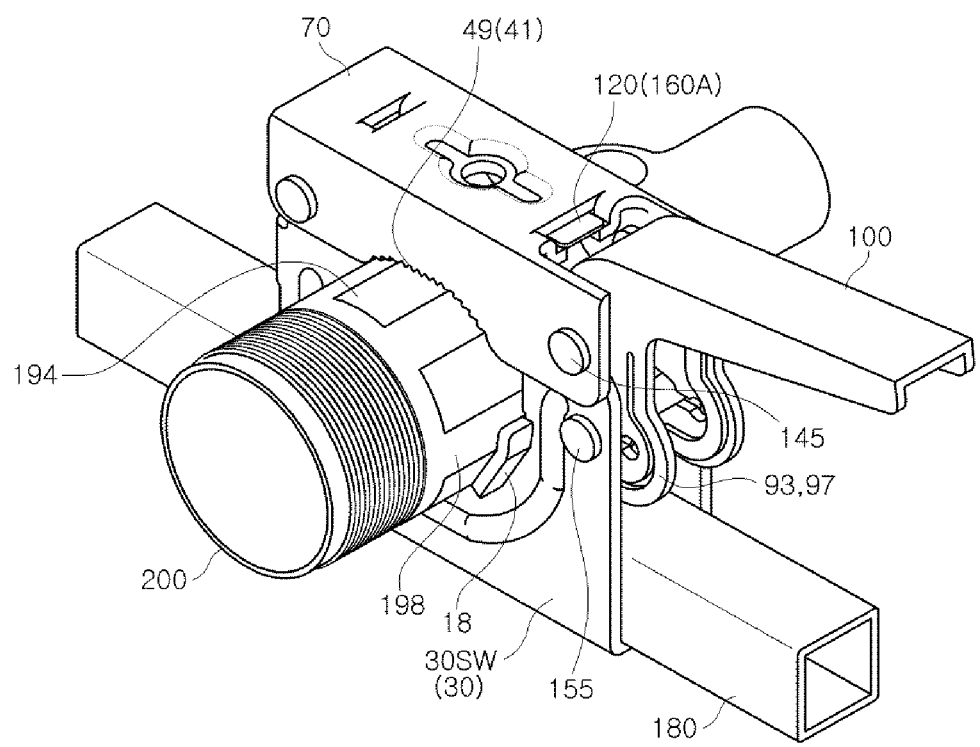

However, the tube locking and releasing device 160A for a fire suppression system and the tube locking and releasing device 160 for a fire suppression system have structures different from each other in the tube seating structure 30 and the tube covering structure 70. First of all, when an appearance of the tube locking and releasing device for a fire suppression system 160A is seen, the tube covering structure 70 includes the gear tooth shaped contact protrusions 49 of FIG. 13B or FIG. 14, which contact with the reducer 200 as shown in FIG. 10 or FIG. 18. A structure of the tube seating structure 30 will be described in detail hereinafter.

Referring to FIGS. 10 to 12C, the tube seating structure 30 includes a seating bottom 30B and opposing seating walls 30SW. The seating bottom 30B extends in a predetermined width in a direction. More particularly, the seating bottom 30B is configured to have a rectangular shape. Each of the seating walls 30SW is standing to face each other on opposite edges of the seating bottom 30B, wherein the opposing seating wall is open at an upper side thereof and defines the curved shape from the upper side toward a lower side as shown in FIG. 12B.

Here, as shown in FIG. 12B, each of the seating walls 30SW includes a seating groove 14 corresponding to the curved shape at a middle area thereof, wherein the seating wall has two friction wings 18 facing each other along a circumference of the seating groove 14 and an elasticity band 25 along the circumference of the seating groove 14 at an opposite side of an entrance of the seating groove 14. The seating wall 30SW has opposite end parts in the vicinity of the entrance of the seating groove 14 due to a bow shape of the seating wall, and as shown in FIG. 12B, as for an outer surface of the seating wall 30SW, a first end part of the opposite end parts of the seating wall 30SW has a relatively straight shape compared to a second end part thereof and the second end part has a step shape.

Accordingly, the first end part of each of the seating walls 30SW has a smaller area than the second end part thereof. The seating wall 30SW has a seating hole 21 and a seating hole 23 on a first end and a second end, respectively. Here, when seen from an area positioned between the seating walls 30SW on the seating bottom 30B, the seating walls 30SW are spaced apart from each other in the same width from a lower side of each of the seating walls 30SW toward the upper side thereof.

Here, unlike each of the seating walls 30S of FIG. 3B, each of the seating walls 30SW does not include the elasticity-support piece 27 of FIG. 3B protruding toward a middle area positioned between the seating walls 30SW from each of the seating walls 30SW. Accordingly, the tube seating structure 30 and the tube covering structure 70 do not receive the elastic body 138 of FIG. 8B therebetween.

Referring to FIGS. 10 to 12C, and FIGS. 13A to 14, the tube covering structure 70 includes the cover walls 70SW and the cover ceiling 70C. The first side part of each of the cover walls 70SW is hinged to each of the seating walls 30SW on the upper side of the opposing seating wall 30SW so as to intermittently cover the outer surface of each of the seating walls 30SW as shown in FIG. 10 or FIG. 11A. More particularly, each of the cover walls 70SW includes a cover groove 41 provided thereon at the entrance of the seating groove 14 of each of the seating walls 30SW, wherein the cover groove 41 includes gear tooth shaped contact protrusions 49 on a circumference thereof, the gear tooth shaped contact protrusions 49 facing an area positioned between the two friction wings 18 of FIG. 3B.

As shown in FIG. 14, the gear tooth shaped contact protrusions 49 include: first contact protrusions 43 provided on a middle area of the circumference of the cover groove 41, the first contact protrusions having press protrusions toward a center of an arc of the cover groove 41; and a second protrusion 45 and a third contact protrusion 47 provided on opposite edges of the circumference of the cover groove 41, the second protrusion and the third contact protrusion having press protrusions facing each other.

When seen relative to the seating bottom 30B of FIG. 12A, the first side part of each of the cover walls 70SW is positioned at a level higher than a level of the second side part of each of the cover walls 70SW, and when each of the cover walls 70SW covers the outer surface of each of the seating walls 30SW, as shown in FIG. 10 or FIG. 11A, the first side part of each of the cover walls 70SW is spaced apart from the elasticity band 25 of each of the seating walls 30SW, and the second side part of each of the cover walls 70SW is in contact with the elasticity band 25 of each of the seating walls 30SW.

A cover hole 54 of FIG. 13B of the first side part of each of the cover walls 70SW is hinged to the seating hole 21 of FIG. 12B of the first end of each of the seating walls 30SW by a first hinge rivet 135 of FIG. 10 or FIG. 11A, and when each of the cover walls 70SW covers the outer surface of each of the seating walls 30SW, a second hinge rivet 145 of FIG. 10 or FIG. 11A passes through a cover hole 58 of FIG. 13B of the second side part of each of the cover walls 70SW such that the second hinge rivet 145 is supported by a step-shaped structure of the second end part of each of the seating walls 30SW as shown in FIG. 10 or FIG. 11A.

The cover ceiling 70C above each of the seating walls 30SW connects the cover walls 70SW to each other. More particularly, when the cover ceiling 70C covers the outer surface of each of the seating walls 30SW in cooperation with each of the cover walls 70SW, the cover ceiling 70C has a first pair of holding protrusions P1, a pressing means 65, and a second pair of holding protrusions P2 consecutively positioned from the first end part of each of the seating walls 30SW toward the second end part of each of the seating walls 30SW. The first pair of holding protrusions P1 have the same shape as the second pair of holding protrusions P2 as shown in FIG. 13A or FIG. 18.

The first pair of holding protrusions P1 protrude from opposite edges of a ceiling holding hole 61 positioned immediately above the first end part of each of the seating walls 30SW toward an area positioned between the seating walls 30SW and bend toward each other. When seen from the outer surface of the cover ceiling 70C, the pressing means 65 is formed by being depressed in a slot shape with a bulging center from the outer surface of the cover ceiling 70C toward an inner surface thereof so as to have a thick width at a middle area thereof and thin widths on opposite edges thereof, wherein a press hole H is provided at the middle area of the slot shape with a bulging center.

In addition, the second pair of holding protrusions P2 protrude from opposite edges of a ceiling holding hole 63 positioned immediately above the second end part of each of the seating walls 30SW toward an area positioned between the seating walls 30SW and bend toward each other. Here, the tube locking and releasing device 160A for a fire suppression system and the tube locking and releasing device 160 for a fire suppression system have the same structures in the tube fixing structure 100 and the tube pressing structure 120 or 120A. Meanwhile, the tube locking and releasing device 160A for a fire suppression system and the tube locking and releasing device 160 for a fire suppression system have the same combination relations in the tube seating structure 30, the tube covering structure 70, the tube fixing structure 100, and the tube pressing structure 120 or 120A.

FIGS. 15 to 18 are views describing how to use the tube locking and releasing device for a fire suppression system according to the present invention. FIGS. 15 to 18 will be described referring to FIGS. 1 to 14.

Figure 15:
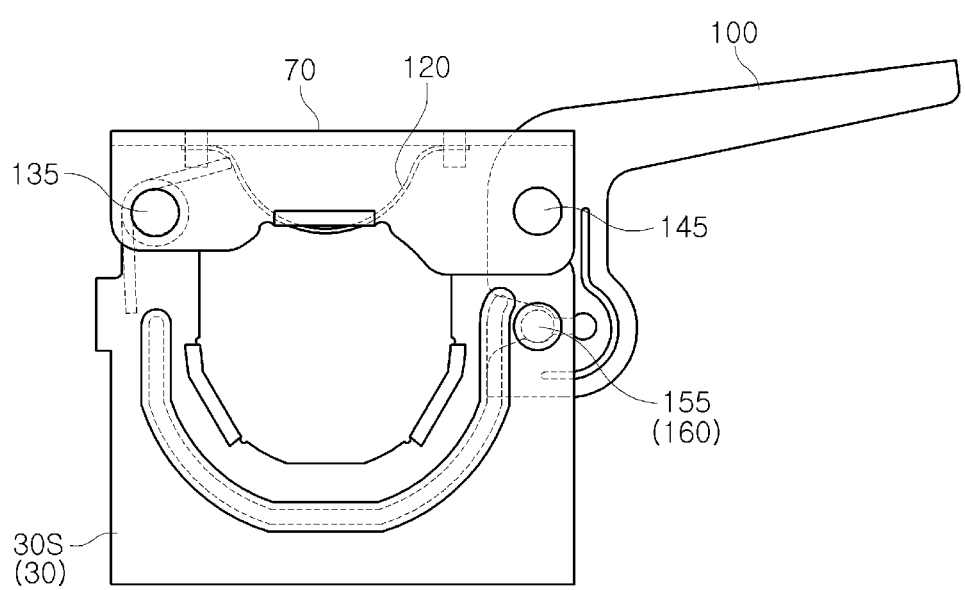
FIGS. 15 to 18 are views describing how to use the tube locking and releasing device according to the present invention.

Referring to FIGS. 15 to 18, to connect the sprinkler (not shown) to a fire suppression pipe (not shown) in a building, the tube locking and releasing device, which is 160 of FIG. 15 or 160A of FIG. 18, for a fire suppression system, the support tube 180, and the reducer 200 may be provided. The tube locking and releasing device 160 or 160A for a fire suppression system may include the tube seating structure 30, the tube covering structure 70, the tube fixing structure 100, and the tube pressing structure 120.

More particularly, the tube locking and releasing device 160 for a fire suppression system may be configured to allow the first hinge rivet 135 to pass through the tube seating structure 30 and the tube covering structure 70 so as to rotate the tube covering structure 70 relative to the tube seating structure 30. The tube locking and releasing device 160 for a fire suppression system may be configured to allow the second hinge rivet 145 to pass through the tube covering structure 70 and the tube fixing structure 100 so as to rotate the tube fixing structure 100 relative to the tube covering structure 70.

Here, the tube covering structure 70 may include the tube pressing structure 120 of FIG. 6A attached to the cover ceiling 70C. The tube pressing structure 120 may be replaced with the tube pressing structure 120A having a different shape as shown in FIG. 7B. Next, when the seating groove 14 of the tube seating structure 30 is opened by the tube covering structure 70, the support tube 180 may be positioned on the seating bottom 30B positioned between the seating walls 30S of the tube seating structure 30.

Here, the support tube 180 may protrude from the seating groove 14 of the tube seating structure 30. Subsequently, the reducer 200 may be inserted into the seating groove 14 provided on each of the seating walls 30S of the tube seating structure 30. While the reducer 200 is inserted into the seating walls 30, the ring shaped angular outer surfaces 194 of the reducer 200 may contact with an edge of the seating groove 14 and the two friction wings 18 positioned in the vicinity of the seating groove 14 on each of the seating walls 30S.

Here, the reducer 200 may contact with the support tube 180 via the seating groove 14 of each of the seating walls 30S. In a different manner, the support tube 180 may be inserted between the seating walls 30S later than the reducer 200. When the tube covering structure 70 performs the first rotation R1 in a predetermined direction relative to the tube seating structure 30 after the support tube 180 and the reducer 200 are inserted into the tube seating structure 30, the seating groove 14 of the tube seating structure 30 may be closed by the tube covering structure 70.

More particularly, the tube seating structure 30 and the tube covering structure 70 may surround by using the seating groove 14 and the cover groove 44. Here, the seating groove 14 of the tube seating structure 30 and the cover groove 44 of the tube covering structure 70 may contact with ring-shaped outer surfaces 198. In addition, the tube covering structure 70 may bring the friction applying wing 48 positioned in the vicinity of the cover groove 44 into contact with the ring shaped angular outer surfaces 194 of the reducer 200.

The friction wings 18 and the friction applying wing 48 may prevent the idle-rotating of the reducer 200 in the seating groove 14 of the tube seating structure 30. In addition, the tube pressing structure 120 or 120A may contact with the reducer 200 while the tube seating structure 30 is covered by the tube covering structure 70. Subsequently, in the tube locking and releasing device 160, the tube fixing structure 100 may perform the second rotation R2 in a predetermined direction relative to the tube covering structure 70 due to force applied from an outside.

More particularly, while rotating relative to the tube covering structure 70, the tube fixing structure 100 rotates around the second hinge rivet 145, which connects the cover walls 70S to each other, on the tube covering structure 70, and catches the lock rivet 155, which connects the seating walls 30S to each other, under the second hinge rivet 145 in a one-touch method so as to combine the tube seating structure 30 with the tube covering structure 70.

Here, the tube pressing structure 120 or 120A may bring the reducer into close contact with the support tube 180 by pushing the reducer 200 through the cover groove 44. In a different manner, when the tube locking and releasing device 160A of FIG. 18 for a fire suppression system is used, the reducer 200 is inserted into the seating walls 30 and may contact with edges of the seating groove 14 of FIG. 12B of each of the seating walls 30SW and the two friction wings 18 positioned in the vicinity of the seating groove 14 via the ring shaped angular outer surfaces 194 of the reducer 200. Furthermore, the reducer 200 may contact with the gear tooth shaped contact protrusions 49 positioned on a circumference of the cover groove 41 in cooperation with the cover groove 41 of the tube covering structure 70 by using the ring shaped angular outer surfaces 194 thereof.

What is claimed is:

1. A tube locking and releasing device, the device comprising:
    a tube seating structure including: a seating bottom extending in a predetermined width in a direction; and opposing seating walls standing to face each other on opposite edges of the seating bottom, each of the seating walls being open at an upper side thereof and having a curved shape defined from the upper side toward a lower side thereof;
    a tube covering structure including: opposing cover walls provided so as to intermittently cover an outer surface of the upper side of each of the seating walls, a first side part of each of the cover walls being hinged to the seating wall; and a cover ceiling provided above each of the seating walls, the cover ceiling connecting the cover walls to each other;
    a tube fixing structure including: a handle fixing part positioned between the cover walls at a second side part of the cover wall, the handle fixing part being hinged to each of the cover walls and being intermittently locked to each of the seating walls; and a handle press part protruding from the handle fixing part thereon so as to be bent; and
    a tube pressing structure being attached to/detached from the cover ceiling, the tube pressing structure protruding downward from the cover ceiling when attached to the cover ceiling, wherein the tube seating structure, the tube covering structure, the tube fixing structure, and the tube pressing structure surround a support tube fixed to a building and a reducer positioned on a sprinkler, the reducer being in close contact with the support tube, and the tube covering structure includes a friction applying wing comprised of a single body or gear tooth shaped contact portions, which contact with the reducer.

2. The device of claim 1, wherein each of the seating walls includes a seating groove corresponding to the curved shape at a middle area thereof, wherein the seating wall has two friction wings facing each other along a circumference of the seating groove and an elasticity band along the circumference of the seating groove at an opposite side of an entrance of the seating groove.

3. The device of claim 2, wherein the seating wall has opposite end parts in the vicinity of the entrance of the seating groove due to a bow shape of the seating wall, wherein when the outer surface of the seating wall is seen, a first end part of the opposite end parts of the seating wall has a relatively straight shape compared to a second end part thereof and the second end part has a step shape.

4. The device of claim 2, wherein the seating wall has opposite end parts in the vicinity of the entrance of the seating groove due to the bow shape of the seating wall and has an elasticity-support piece provided on a first end part of the seating wall, wherein the elasticity-support piece is positioned at the same level as a level of an end of the elasticity band on the first end part and protrudes from each of the seating walls toward a middle area positioned between the seating walls.

5. The device of claim 2, wherein when seen from an area positioned between the seating walls on the seating bottom, the seating walls are spaced apart from each other in the same width from a lower side of each of the seating walls toward the upper side thereof.

6. The device of claim 2, wherein each of the cover walls includes a cover groove provided thereon at the entrance of the seating groove of each of the seating walls, wherein the cover groove has the friction applying wing comprised of a single body on a circumference thereof, the friction applying wing facing an area positioned between the two friction wings.

7. The device of claim 2, wherein each of the cover walls includes a cover groove provided thereon at the entrance of the seating groove of each of the seating walls, wherein the cover groove includes the gear tooth shaped contact portions on a circumference thereof, the gear tooth shaped contact portions facing an area positioned between the two friction wings.

8. The device of claim 7, wherein the gear tooth shaped contact portions include: first contact protrusions provided on a middle area of the circumference of the cover groove, the first contact protrusions having press protrusions toward a center of an arc of the cover groove; and second and third contact protrusions provided on opposite edges of the circumference of the cover groove, the second and third contact protrusions having press protrusions facing each other.

9. The device of claim 2, wherein when seen relative to the seating bottom, the first side part of each of the cover walls is positioned at a level higher than a level of the second side part of each of the cover walls, and when each of the cover walls covers the outer surface of each of the seating walls, the first side part of each of the cover walls is spaced apart from the elasticity band of each of the seating walls, and the second side part of each of the cover walls is in contact with the elasticity band of each of the seating walls.

10. The device of claim 3, wherein a cover hole of the first side part of each of the cover walls is hinged to a seating hole of a first end of each of the seating walls by a first hinge rivet, and when each of the cover walls covers the outer surface of each of the seating walls, a second hinge rivet passes through a cover hole of the second side part of each of the cover walls such that the second hinge rivet is supported by a step shaped structure of the second end part of each of the seating walls.

11. The device of claim 3, wherein when the cover ceiling covers the outer surface of each of the seating walls in cooperation with each of the cover walls, the cover ceiling has a first pair of holding protrusions, a pressing means, and a second pair of holding protrusions consecutively positioned thereon from the first end part of each of the seating walls toward the second end part of each of the seating walls.

12. The device of claim 11, wherein the first pair of holding protrusions protrude from opposite edges of a ceiling holding hole positioned immediately above the first end part of each of the seating walls toward an area positioned between the seating walls and bend toward each other.

13. The device of claim 11, wherein when seen from an outer surface of the cover ceiling, the pressing means is formed by being depressed in a slot shape with a bulging center from the outer surface of the cover ceiling toward an inner surface thereof so as to have a thick width at a middle area thereof and thin widths on opposite edges thereof, wherein a press hole is provided at the middle area thereof.

14. The device of claim 11, wherein the second pair of holding protrusions protrude from opposite edges of a ceiling holding hole positioned immediately above the second end part of each of the seating walls toward an area positioned between the seating walls and bend toward each other.

15. The device of claim 2, wherein when seen from an area positioned between the seating walls, the handle fixing part and the handle press part have depressions defined along inner surfaces of the tube fixing structure, expose the inner surfaces of the tube fixing structure to an outside of each of the seating walls, and have predetermined angles to each other.

16. The device of claim 2, wherein when seen from an outer surface of the cover ceiling, each of the seating walls and each of the cover walls are exposed to an outside of the cover ceiling at the second side part of the cover wall such that the handle fixing part is positioned at a dummy hole of the cover ceiling.

17. The device of claim 10, wherein the handle fixing part has a handle fixing upper part between the cover walls and between the seating walls, has a handle fixing lower part between the seating walls, and has an elasticity-applying groove band thereon, the elasticity-applying groove band giving elasticity to movement of the handle fixing lower part relative to the handle fixing upper part.

18. The device of claim 17, wherein the handle fixing upper part between the cover walls has a combination hole provided thereon, and the second hinge rivet passes through the combination hole such that the handle fixing upper part is hinged to the cover walls.

19. The device of claim 17, wherein the handle fixing upper part and the handle fixing lower part have first to third open parts consecutively defined at areas positioned between the handle fixing upper part and the handle fixing lower part so as to hold a lock rivet connecting the seating walls to each other under the second side part of each of the cover walls and allow the lock rivet to intermittently contact with the first open part and the second open part.

20. The device of claim 17, wherein the handle fixing lower part, which is positioned under the handle fixing upper part, and the handle fixing upper part have open ring shapes on one sides thereof and are provided to be integral to each other, wherein when a lock rivet connecting the seating walls to each other is held between the handle fixing upper part and the handle fixing lower part, the handle fixing lower part moves relatively to the handle fixing upper part.

21. The device of claim 17, wherein when seen from open directions of the handle fixing upper part and the handle fixing lower part, the handle fixing lower part is arranged so as to be vertical to the handle fixing upper part when the handle fixing part is locked to each of the seating walls, so that the handle fixing lower part between the seating walls is spaced apart from the reducer.

22. The device of claim 17, wherein the elasticity-applying groove band is positioned on outer surfaces facing each other of the handle fixing upper part and the handle fixing lower part so as to have a jaw shape and protrudes from the outer surfaces of the handle fixing part toward inner surfaces thereof.

23. The device of claim 4, wherein each of the seating walls and each of the cover walls are hinged to each other by a first hinge rivet at a first end of each of the seating walls, and a spring is wound on the first hinge rivet, wherein a first end of the spring is in contact with the elasticity-support piece and a second end of the spring is in contact with the cover ceiling.

24. The device of claim 11, wherein the tube pressing structure bends downward from opposite end parts of an outer surface of the cover ceiling toward an intermediate area thereof between each of the seating walls and between each of the cover walls so as to have a thin plate spring shape, and when seen from an inner surface of the cover ceiling, the tube pressing structure includes a rectangular shape spring frame provided at a middle area thereof and opposite holding pieces provided on opposite edges thereof, each of the holding pieces protruding from the spring frame toward an outside of the spring frame, wherein an occupying area of each of the holding pieces is smaller than an occupying area of the spring frame between the seating walls.

25. The device of claim 24, wherein one holding piece of the opposite holding pieces is held by the first pair of holding protrusions on the cover ceiling, and the remaining holding piece thereof is held by the second pair of holding protrusions; and the spring frame is bent toward an area positioned under the cover ceiling from the opposite holding pieces so as to have a bow shape, wherein when the handle fixing part is locked to each of the seating walls, the spring frame pushes the reducer so as to bring the reducer into close contact with the support tube.

26. The device of claim 11, wherein the tube pressing structure protrudes downward from the cover ceiling between each of the seating walls and between each of the cover walls so as to have a knob shaped elastic body and includes a cube-shaped rubber elastic body and a rubber fitting part provided on the rubber elastic body to be integral thereto, the rubber elastic body and the rubber fitting part being consecutively arranged from an area positioned under an inner surface of the cover ceiling toward an outer surface thereof and, wherein an occupying volume of the rubber fitting part is smaller than an occupying volume of the rubber elastic body between the seating walls.

27. The device of claim 26, wherein the rubber fitting part includes: a rubber fitting neck fitted to the press hole of the pressing means on the cover ceiling; and a rubber fitting head provided on the rubber fitting neck, the rubber fitting head having a size larger than a size of the rubber fitting neck and being exposed to the outer surface of the cover ceiling, and the rubber elastic body under the rubber fitting neck protrudes downward between the seating walls, and when the handle fixing part is locked to each of the seating walls, the rubber elastic body pushes the reducer so as to bring the reducer into close contact with the support tube.

\* \* \* \* \*